(12) United States Patent
Sandhu

(10) Patent No.: US 7,048,325 B1
(45) Date of Patent: May 23, 2006

(54) ADJUSTABLE VEHICLE CROSS BEAM

(76) Inventor: Chain Singh Sandhu, 10313 Seven Mile Rd., Northville, MI (US) 48167

( * ) Notice: Subject to any disclaimer, the term of this patent is extended or adjusted under 35 U.S.C. 154(b) by 0 days.

(21) Appl. No.: 10/970,543

(22) Filed: Oct. 21, 2004

(51) Int. Cl.
*B62D 25/08* (2006.01)

(52) U.S. Cl. .................... 296/193.02; 296/70; 280/779

(58) Field of Classification Search .......... 296/193.02, 296/70, 72, 203.02; 280/779; 180/90; 29/897.2
See application file for complete search history.

(56) References Cited

U.S. PATENT DOCUMENTS

| 2,910,314 | A | | 10/1959 | Klein |
| 5,295,708 | A | | 3/1994 | Siga et al. |
| 5,868,426 | A | * | 2/1999 | Edwards et al. ............... 296/70 |
| 5,934,733 | A | * | 8/1999 | Manwaring ................... 296/72 |
| 6,092,840 | A | | 7/2000 | Sugawara |
| 6,382,695 | B1 | * | 5/2002 | Decome ....................... 296/70 |
| 6,581,967 | B1 | * | 6/2003 | Logan et al. .................. 296/72 |
| 6,644,690 | B1 | * | 11/2003 | Brownlee et al. ............. 296/72 |
| 6,685,259 | B1 | | 2/2004 | Shimase et al. |
| 2004/0135400 | A1 | * | 7/2004 | Matsuzaki et al. ..... 296/193.02 |

* cited by examiner

*Primary Examiner*—Jason Morrow
(74) *Attorney, Agent, or Firm*—Rader, Fishman & Grauer PLLC

(57) ABSTRACT

An adjustable cross beam for a vehicle. The cross beam includes two members that are configured to be adjustably coupled to form a cross beam of variable span. The modular nature of the members and adjustability allows the cross beam to be used in a variety of vehicles, thereby reducing necessary cross beam inventory and excess spare parts.

20 Claims, 4 Drawing Sheets

ADJUSTABLE VEHICLE CROSS BEAM

TECHNICAL FIELD

The invention generally relates to automotive structural components, and more particularly, to an adjustable-width cross beam for an automobile.

BACKGROUND

Typical vehicle bodies have a frame with a pair of vertical pillars on opposite sides of the vehicle body at the juncture of an engine compartment and a passenger compartment. The pillars are connected by a cross beam at the cowl of the vehicle body forward of an instrument panel. The cross beam provides cross car stiffness, assists in managing side impact loads, and supports the steering column and air bags. The cross beam also provides support for the dashboard, glove compartment, and various instruments of an instrument panel.

The cross beam also serves integrally with the instrument panel to receive the electronic control modules, wiring harnesses, and duct work. Cross beams are usually vehicle type specific, meaning that separate vehicle types have individually designed and manufactured cross beams with vehicle specific mounting locations for the steering wheel, airbags, and other components. A particular vehicle type may have more than one unique cross beam, such as for left and right hand drive models of the same vehicle.

Designing and manufacturing a unique cross beam for each vehicle type requires additional resources and tooling. Additionally, unused cross beams are typically scrapped after production ceases of a particular vehicle type.

There exists a need for a cross beam that will provide increased commonality between vehicle types, reduced design and manufacturing costs, reduced piece-part costs, lower the amount of unused parts, as well as lower inventory costs. Additionally, the need exists for a cross beam that may be used for both left and right hand drive vehicles to further reduce design time and costs.

SUMMARY

A telescopic cross beam assembly is disclosed. The telescopic cross beam assembly includes a first structural member having a first pillar attachment end and an adjustable coupling end, and a second structural member having a second pillar mounting end and a receiving end, wherein said receiving end selectively engages said coupling end to allow said cross beam assembly to span a distance between two pillars of said vehicle.

DETAILED DESCRIPTION

Figure 1:
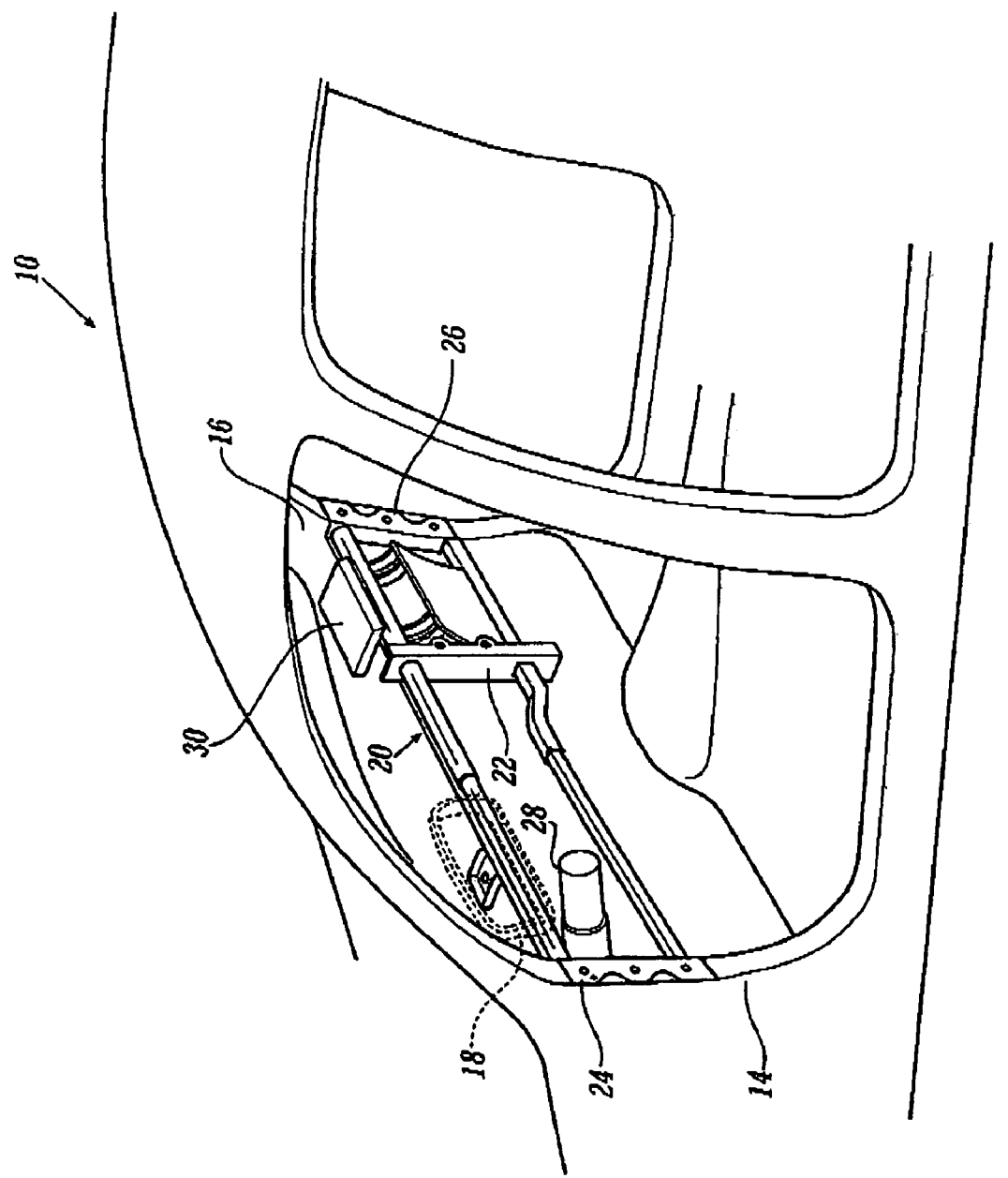
FIG. 1 is a perspective view of an automotive instrument panel, generally illustrating the location of the vehicle cross beam, according to an embodiment.

FIG. 1 illustrates a vehicle 10 to include a driver structural pillar 14, a passenger structural pillar 16, and a cross beam 20 connecting the two pillars. An instrument panel 18 is generally a collection of gauges and controls along with the aesthetic packaging typically supplied in a vehicle and supported by cross beam 20. Cross beam 20 may include a central support 22, a driver support 24 and a passenger support 26. As illustrated, driver support 24 is coupled to driver structural pillar 14, and passenger support 26 is coupled to passenger structural pillar 16. Cross beam 20 may also support a steering column 28, an airbag 30, a wiring harness (not shown), a radio (not shown) and various other desired items.

Figure 2:
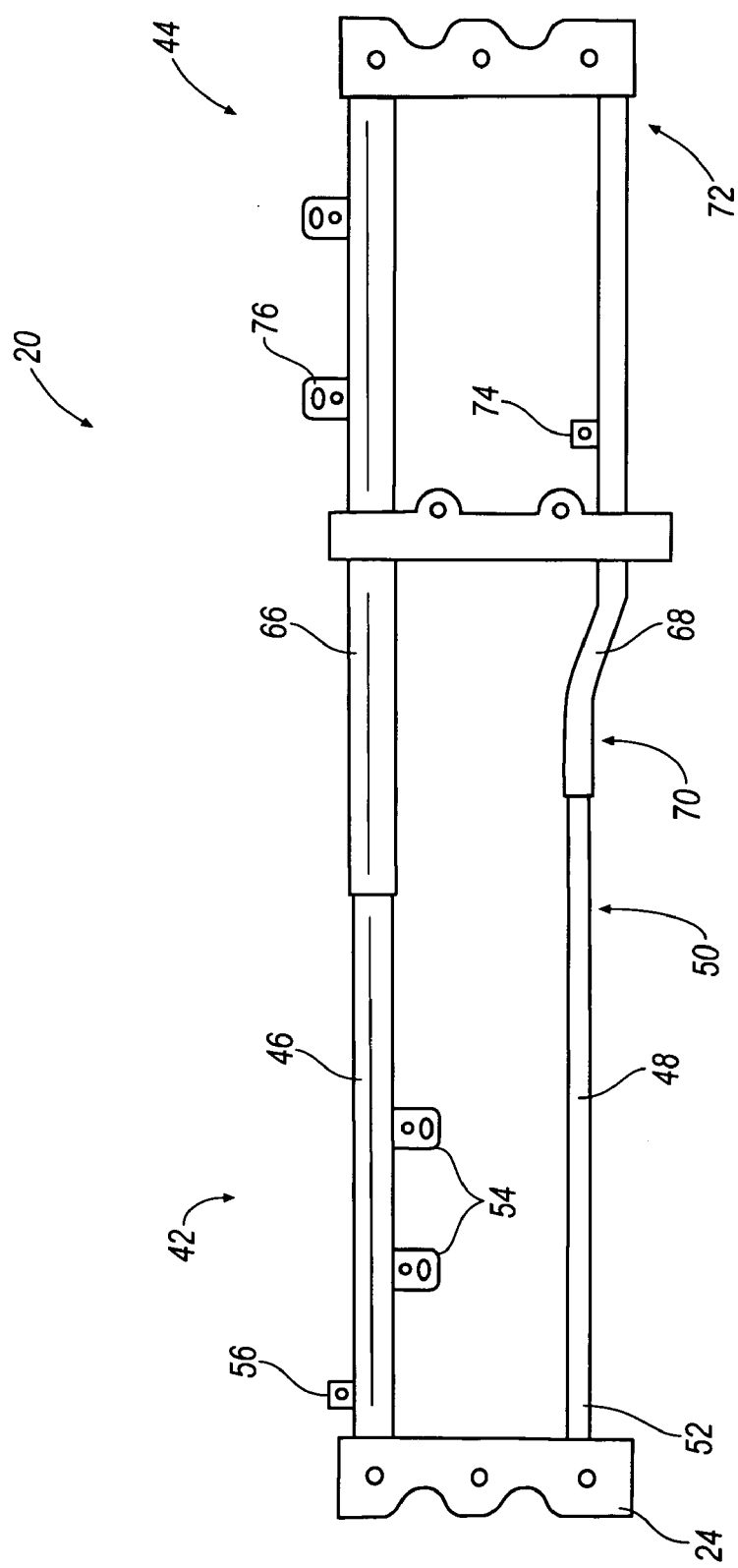
FIG. 2 is a perspective view of the cross beam of FIG. 1.

With reference to FIG. 2, cross beam 20 is illustrated in greater detail. In the embodiment shown, cross beam 20 includes a first member 42 and a second member 44. First member 42 includes an upper arm 46 and a lower arm 48. First member 42 further includes an adjustable coupling end 50, a pillar attachment end 52, a steering column attachment 54, and auxiliary attachments 56. Second member 44 includes an upper arm 66 and a lower arm 68. Second member 44 further includes a receiving end 70, a pillar attachment end 72, a glove compartment attachment 74, and auxiliary attachments 76. As illustrated, adjustable coupling end 50 of first member 42 and receiving end 70 of second member 44 are adjustably coupled to allow for axial movement therebetween, as discussed in greater detail below. Thus provided, cross beam 20 may be adjusted to span varying distances between the driver structural pillar 14 and the passenger structural pillar 16.

Figure 3:
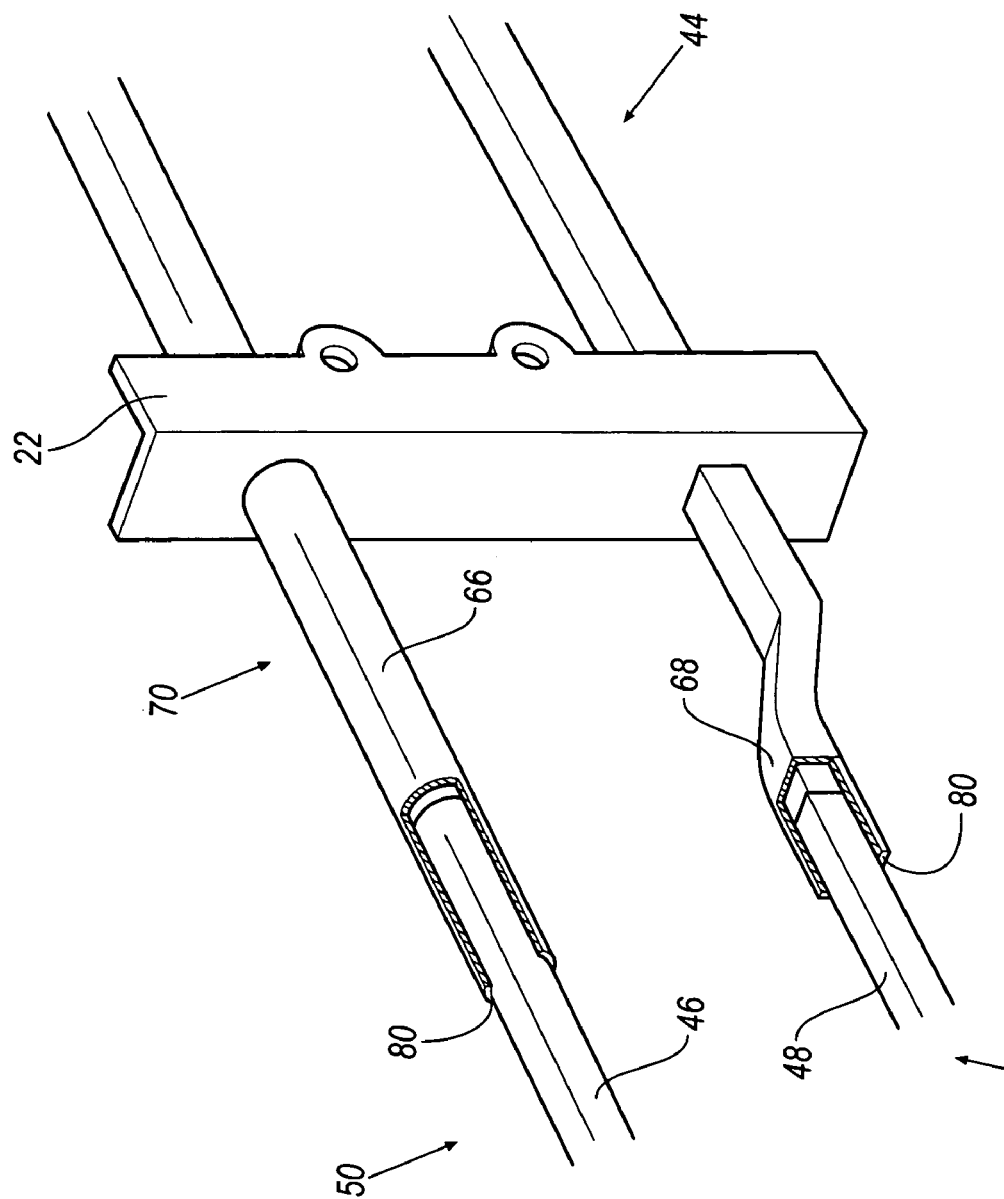
FIG. 3 illustrates a perspective view of a portion of the crossbeam of FIG. 2, showing the adjustable attachment of the members of the crossbeam.

Referring now to FIG. 3, the adjustable coupling end 50 and the receiving end 70 are illustrated in greater detail. Adjustable coupling end 50 is illustrated wherein upper arm 46 is a cylindrical tube extending within upper arm 66 of second member 70. Lower arm 48 is illustrated as a rectangular tube that extends into lower arm 68. As illustrated, first member 42 and second member 44 are sized to matingly couple with a close tolerance between upper arms 46, 66, and between lower arms 48, 68. First member 42 and second member 44 may be welded about the perimeter of an axial end 80 of second member 44. Thus provided, cross beam 20 may be installed in vehicles 10 of varying distances between pillars 14, 16 by adjusting the span of cross beam 20. This adjustment may be made before or during installation of cross beam 20 in vehicle 10. While securing first member 42 to second member 44 is illustrated in a preferred embodiment by welding, it would be appreciate that other known means of securing structural members may be employed, or that no securing means may be employed, as desired.

As best seen in FIG. 2, upper arms 46, 66 of cross beam 20 are illustrated in a preferred embodiment to be located about a common axis to provide cross-car stiffness and side impact resistance for vehicle 10. Preferably, upper arms 46, 66 are located between driver structural pillar 14 and passenger structural pillar 16. As best seen in FIG. 3, the attachment of upper arms 46, 66 provides a portion of cross beam 10, having a portion of upper arm 66 with a portion of upper arm 46 interposed therein, that will have a higher moment of inertia than either upper arm 46 or upper arm 66 alone, thereby providing resistance to buckling of cross beam 20 during a side impact. As would be appreciated, manufacturing a one-piece upper arm with a tuned buckling resistance, such as provided in the present embodiment, would require additional cost and complexity. Therefore, this coupling arrangement provides a cross beam 10 manufactured with tubular portions for cost efficiency, manufacturing simplicity and side impact resistance. The diameters and thicknesses of upper arms 46, 66 may be tuned to provide a desirable level of impact resistance. Auxiliary attachments 56, 76 may be perimeter welded or clamped to upper arms 46, 66, and not through bolted, so as not to reduce the desired moment of inertia.

As illustrated in FIGS. 2 and 3, lower arms 48, 68 of cross beam 20 preferably lie within separate axes. In this embodiment, lower arms 48, 68 do not contribute significantly to cross car stiffness, but would provide some degree of buckling resistance for upper arms 46, 66.

Figure 4:
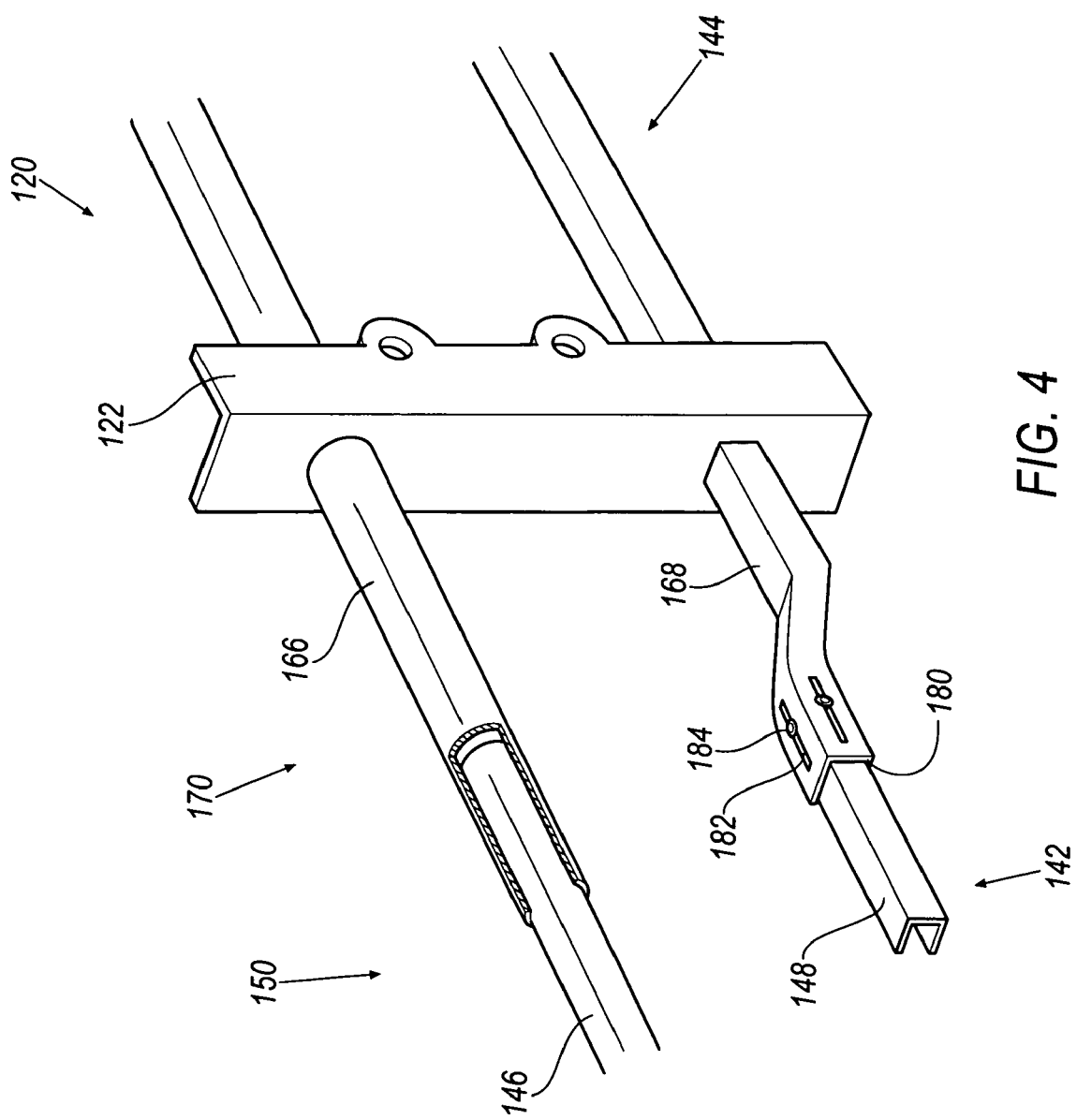
FIG. 4 illustrates an alternate embodiment of an adjustable cross beam.

As illustrated in FIG. 4, an alternate embodiment of cross beam 20 is illustrated as cross beam 120 that includes a first member 142 and a second member 144. First member 142 includes an upper arm 146 and a lower arm 148. First member 142 further includes an adjustable coupling end 150, a pillar attachment end (not shown), a steering column attachment (not shown), and auxiliary attachments (not shown). Second member 144 includes an upper arm 166 and a lower arm 168. First member 142 further includes a receiving end 170, a pillar attachment end (not shown), a glove compartment attachment (not shown), and auxiliary attachments (not shown). As illustrated, adjustable coupling end 150 and receiving end 170 are adjustably coupled to allow for axial movement therebetween, as discussed in greater detail below. Thus provided, cross beam 120 may be adjusted to span varying distances between the driver structural pillar 14 and the passenger structural pillar 16 of vehicle 10.

The adjustable coupling end 150 and the receiving end 170 are illustrated in greater detail. Adjustable coupling end 150 is illustrated wherein upper arm 146 is a cylindrical tube extending within upper arm 166 of second member 170. Lower arm 148 is preferably a stamped channel that extends into lower arm 168 which is also a stamped channel. As illustrated, first member 142 and second member 144 are sized to matingly couple with a close tolerance between upper arms 146, 166, and between lower arms 148, 168. First member 142 and second member 144 may be welded about the perimeter of an axial end 180 of second member 144, or adjustable slots 182 may be provided within lower arms 148, 168 to allow fasteners 184 to join lower arms 148, 168. Thus provided, cross beam 120 may be installed in vehicles 10 of varying distances between pillars 14, 16 by adjusting the span of cross beam 120.

The present embodiments have been described with reference to certain exemplary embodiments thereof. However, it will be readily apparent to those skilled in the art that it is possible to embody the invention in specific forms other than those of the exemplary embodiments described above. For example, though the embodiment of the modular instrument panel described herein includes three separate, non-integral portions, other embodiments within the scope of this invention may comprise two or more such portions. This and other variations may be made without departing from the spirit of the invention. The exemplary embodiments are merely illustrative and should not be considered restrictive in any way. The scope of the invention is defined by the appended claims and their equivalents, rather than by the preceding description.

The invention claimed is:

1. An adjustable vehicle cross beam assembly comprising:
   a first structural member having a first pillar attachment end and an adjustable coupling end, wherein said first structural member is selectively attached to a first pillar; and
   a second structural member having a second pillar mounting end and a receiving end, wherein said second structural member is selectively attached to a second pillar, said receiving end selectively engages said coupling end to allow said cross beam assembly to span a distance between the first pillar and the second pillar, and wherein said distance is generally a first distance for a first vehicle type and said distance is generally a second distance for a second vehicle type.

2. The assembly of claim 1, wherein said coupling end is tubular.

3. The assembly of claim 1, wherein said first member further includes a steering support attachment.

4. The assembly of claim 1, wherein said coupling end includes at least two tubular arms.

5. The assembly of claim 1, wherein said first structural member is selectively adapted to slide into at least a portion of said second structural member.

6. The assembly of claim 1, wherein said two pillars are located at opposite sides of said vehicle.

7. The assembly of claim 1, wherein said assembly is selectively coupled to a steering column.

8. The assembly of claim 1, further comprising an instrument panel.

9. A method of installing a vehicle cross beam, the cross beam providing structural support between a first pillar and a second pillar, the first pillar and the second pillar having a variable distance therebetween depending upon vehicle type, the method comprising:
   coupling a first member with a second member, wherein at least the first member and the second member form the cross beam, the first member and the second member are selectively secured together in a predetermined orientation, the predetermined orientation is dependent upon a distance between an attachment location of the first pillar and an attachment location of the second pillar, the predetermined orientation is generally a first orientation for a first vehicle type, the predetermined orientation is generally a second orientation for a second vehicle type, and wherein the cross beam, when secured in the second orientation, is not adequate as a cross beam for the first vehicle type;
   attaching the first member to the first pillar; and
   attaching the second member to the second pillar.

10. The method of claim 9, further comprising attaching a steering column to the cross beam.

11. The method of claim 9, further comprising determining the distance between the attachment location of the first pillar and the attachment location of the second pillar.

12. The method of claim 9, further comprising axially sliding the first member into engagement with the second member.

13. A telescopic vehicle cross beam assembly comprising:
   a first structural member having a first pillar attachment end and an adjustable coupling end, wherein said first structural member is selectively attached to a first pillar; and
   a second structural member having a second pillar mounting end and a receiving end, wherein said second structural member is selectively attached to a second pillar, said receiving end slideably receiving said coupling end to allow said cross beam assembly to span a distance between the first pillar and the second pillar, and wherein at least a portion of said adjustable coupling end and at least a portion of said receiving end are positioned in a central region of said cross beam.

14. The assembly of claim 13, wherein said coupling end is tubular.

15. The assembly of claim 13, wherein said first member further includes a steering support attachment.

16. The assembly of claim 13, wherein said coupling end includes at least two tubular arms.

17. The assembly of claim 1, wherein at least a portion of said adjustable coupling end and at least a portion of said receiving end are positioned in a central region of said cross beam.

18. The method of claim 11, wherein said step of coupling includes the step of securing the first member to the second member such that a portion of the first member will not move relative a portion of the second member, and wherein said step of securing is performed before said steps of attaching the first member to the first pillar and attaching the second member to the second pillar.

19. The assembly of claim 1, wherein the first structural member is secured to the second structural member to allow the cross beam assembly to span generally the first distance, and the cross beam assembly is not adequate for the second vehicle type.

20. The assembly of claim 13, wherein at least a portion of said adjustable coupling end and at least a portion of said receiving end increase the buckling resistance of said cross beam.

* * * * *